(12) United States Patent
Steinberger et al.

(10) Patent No.: US 11,923,796 B2
(45) Date of Patent: Mar. 5, 2024

(54) APPARATUS FOR SWITCHING AND PROTECTION OF A LOAD BASED ON CURRENT RISE SPEED

(71) Applicant: Future Systems Besitz GmbH, Rödental (DE)

(72) Inventors: Philipp Steinberger, Coburg (DE); Hubert Lenker, Sonneberg (DE); Peter Spiel, Regensburg (DE)

(73) Assignee: Future Systems Besitz GmbH, Rödental (DE)

(*) Notice: Subject to any disclaimer, the term of this patent is extended or adjusted under 35 U.S.C. 154(b) by 357 days.

(21) Appl. No.: 17/429,110

(22) PCT Filed: Feb. 20, 2020

(86) PCT No.: PCT/EP2020/054552
§ 371 (c)(1),
(2) Date: Aug. 6, 2021

(87) PCT Pub. No.: WO2020/169773
PCT Pub. Date: Aug. 27, 2020

(65) Prior Publication Data
US 2022/0352841 A1 Nov. 3, 2022

(30) Foreign Application Priority Data
Feb. 22, 2019 (EP) .................................... 19158869

(51) Int. Cl.
*H02H 3/093* (2006.01)
*H02H 1/00* (2006.01)
(Continued)

(52) U.S. Cl.
CPC ......... *H02P 29/027* (2013.01); *H02H 1/0007* (2013.01); *H02H 3/05* (2013.01);
(Continued)

(58) Field of Classification Search
CPC ............. H02H 3/08; H02H 3/05; H02H 3/093
See application file for complete search history.

(56) References Cited

U.S. PATENT DOCUMENTS

| | | | |
|---|---|---|---|
| 4,080,640 A | * | 3/1978 | Elms ........................ H02H 3/33 361/45 |
| 4,345,292 A | | 8/1982 | Jaeschke et al. |

(Continued)

FOREIGN PATENT DOCUMENTS

| | | | |
|---|---|---|---|
| CN | 114982085 A | * | 8/2022 |
| DE | 42 42 560 A1 | | 7/1993 |

(Continued)

OTHER PUBLICATIONS

Lim, S., "Small DFN Electronic Circuit Breaker Eliminates Sense Resistor," Linear Technology Magazine, May 2005, p. 25 (2 pages).
(Continued)

*Primary Examiner* — Sisay G Tiku
(74) *Attorney, Agent, or Firm* — Maginot, Moore & Beck LLP (57) ABSTRACT

An apparatus for switching and/or protection of a load connected to said apparatus, said apparatus (1) comprising: a power switch (5) through which the connected load receives an electrical current; a sensor component (4) connected in series with said power switch (5) and adapted to generate directly an electrical voltage drop corresponding to a current rise speed of the electrical current flowing via the sensor component (4) and via the power switch (5) to said load; and a driver circuit (6) adapted to detect an occurring overcurrent depending on a voltage drop generated by said sensor component (4) with or without a voltage drop along the power switch (5) and to switch off said power switch (5) upon detection of an overcurrent within a switch-off period to protect said power switch (5) and said load.

26 Claims, 8 Drawing Sheets

(51) Int. Cl.
- *H02H 3/05* (2006.01)
- *H02H 3/08* (2006.01)
- *H02H 7/08* (2006.01)
- *H02H 7/12* (2006.01)
- *H02H 7/122* (2006.01)
- *H02H 7/22* (2006.01)
- *H02P 23/14* (2006.01)
- *H02P 29/024* (2016.01)

(52) U.S. Cl.
CPC .............. *H02H 3/08* (2013.01); *H02H 3/093* (2013.01); *H02H 7/08* (2013.01); *H02H 7/12* (2013.01); *H02H 7/1227* (2013.01); *H02H 7/222* (2013.01); *H02P 23/14* (2013.01)

(56) References Cited

U.S. PATENT DOCUMENTS

| | | | | |
|---|---|---|---|---|
| 4,363,064 | A * | 12/1982 | Billings | H02H 1/06 361/57 |
| 4,733,321 | A * | 3/1988 | Lindeperg | H02H 3/05 361/96 |
| 5,181,155 | A * | 1/1993 | Beg | H02H 3/08 361/87 |
| 8,369,114 | B2 * | 2/2013 | Lin | H02M 1/32 361/93.7 |
| 9,755,428 | B2 * | 9/2017 | Witcher | H02H 9/025 |
| 2004/0051398 | A1 * | 3/2004 | Mohr | H03K 17/0822 307/140 |
| 2004/0145841 | A1 * | 7/2004 | Lambardin | H02H 3/332 361/42 |
| 2006/0203409 | A1 | 9/2006 | Grisoni | |
| 2009/0310270 | A1 | 12/2009 | Burns et al. | |
| 2017/0294774 | A1 | 10/2017 | Illing et al. | |
| 2022/0029415 | A1 * | 1/2022 | Steinberger | H01H 33/596 |
| 2022/0255308 | A1 * | 8/2022 | Steinberger | H02H 3/445 |

FOREIGN PATENT DOCUMENTS

| | | | |
|---|---|---|---|
| DE | 197 29 599 C1 | 2/1999 | |
| DE | 198 39 617 A1 | 3/2000 | |
| DE | 10 2006 019 467 A1 | 10/2007 | |
| DE | 11 2014 006 358 T5 | 10/2016 | |
| DE | 10 2016 116 400 A1 | 3/2018 | |
| EP | 0 473 428 A2 | 3/1992 | |
| EP | 0473428 A2 * | 3/1992 | |
| EP | 1441429 A1 * | 7/2004 | ............ H02H 3/332 |
| EP | 3944438 A1 * | 1/2022 | |
| GB | 2260043 A * | 3/1993 | ............ H02H 1/0015 |
| WO | 2017/068574 A1 | 4/2017 | |
| WO | 2017/127012 A1 | 7/2017 | |

OTHER PUBLICATIONS

International Search Report corresponding to PCT Application No. PCT/EP2020/054552, dated May 27, 2020 (4 pages).

* cited by examiner

APPARATUS FOR SWITCHING AND PROTECTION OF A LOAD BASED ON CURRENT RISE SPEED

This application is a national stage filing from and claims priority to PCT/EP2020/054552, filed on Feb. 20, 2020, which claims priority to European Patent Application No. 19158869.8, filed on Feb. 22, 2019, the entire disclosures of which are incorporated herein by reference.

The invention relates to an apparatus used for switching and/or used for protection of a load connected to the respective apparatus.

Loads connected to a power supply system require overload and overcurrent protection. In an electrical system, the situation may occur where an overcurrent flows through an electrical conductor leading to an excessive generation of heat and damaging the electrical equipment or load. There are many different causes for causing an overcurrent including short circuits, an incorrect circuit design or ground faults. There exists a variety of conventional overcurrent protection devices such as fuses, electromechanical circuit breakers or solid state power switches. Fuses do melt when an overcurrent occurs thus interrupting the electrical current and protecting the load. However, fuses are melting only at relatively high current amplitudes so that much electrical energy can be transferred to the connected load before the fuse does melt thus increasing the risk of damaging components of the respective load. Further, after the cause for the overcurrent has been cleared it is necessary to replace the affected fuse.

Other electrical protection devices employ current sensors to measure an electrical current flowing to the connected load to detect a critical situation and to trigger automatically an electronic or electromechanical switch in case that the critical situation does arise. A current measurement element such as a Hall sensor may measure the electrical current and supply the measurement values to a controller or control logic which can switch off the switching component in case that the measured current exceeds a predetermined threshold value. Some conventional protection circuits use semiconductor switches such as MOSFETs to protect connected loads against overcurrents. With increasing electrical currents flowing via the switched-on semiconductor switch, the voltage drop along the semiconductor switch does also increase so that there occurs a higher power loss at the semiconductor switch. The increasing power loss can cause damaging and even a destruction of the semiconductor switch and/or electronic components within the connected load. Therefore, conventional protection circuits evaluate the voltage drop along its semiconductor switch and switch off the semiconductor switch as soon as the voltage drop exceeds a threshold value. However, this conventional switch-off mechanism does take place only after the electrical current has already reached a high amplitude after a long switch-off period. These conventional protection circuits work comparatively slow and require a high current level to trigger the respective switching component.

Accordingly, it is an object of the present invention to provide a protection apparatus which protects a connected load more efficiently.

This object is achieved by an apparatus comprising the features of claim 1.

The invention provides according to a first aspect an apparatus for switching and/or protection of a load connected to said apparatus, said apparatus comprising:
a power switch through which the connected load receives an electrical current,
a sensor component connected in series with said power switch and adapted to generate directly an electrical voltage drop corresponding to a current rise speed of the electrical current flowing via the sensor component and via the power switch to said load and comprising
a driver circuit adapted to detect an occurring overcurrent depending on a voltage drop generated by said sensor component and/or a voltage drop along the power switch to switch off said power switch upon detection of an overcurrent within a switch-off period to protect said power switch and said load.

In a possible embodiment the switch-off period is less than 1 microseconds.

The switch-off period is predefined by the signal propagation delay of the internal circuitry of the driver circuit. A switch-off period of less than 5 microseconds can be achieved.

The sensor component is a hardware component being configured individually for the associated power switch.

In a possible embodiment of the apparatus according to the first aspect of the present invention, the sensor component comprises a coil which is adapted to generate an induction voltage depending on the electrical current flowing through said sensor component and through said power switch to the connected load.

In a further possible embodiment of the apparatus according to the first aspect of the present invention, the voltage drop generated by the sensor component and the voltage drop along the power switch is applied as a sum voltage to the driver circuit.

In a further possible embodiment of the apparatus according to the first aspect of the present invention, the driver circuit is adapted to determine based on the applied sum voltage an occurring overcurrent, in particular short circuit current, and/or an overload of the power switch and is adapted to switch off the power switch upon detection of an overcurrent and/or upon detection of an overload of the power switch to protect the connected load and/or to protect the power switch within a switch-off period of less than 1 milliseconds.

In a possible embodiment, a switch-off period of less than 5 microseconds can be achieved.

The apparatus according to the present invention provides preferably redundant protection mechanisms using different measurement principles or techniques to protect the power switch against overload and/or against a short circuit current.

In a further possible embodiment of the apparatus according to the first aspect of the present invention, the driver circuit is adapted to switch off the power switch automatically, if the applied sum voltage exceeds a configurable threshold voltage within the switch-off period to protect the apparatus itself and the connected load against overload and/or against a short circuit overcurrent, in particular against a short circuit current.

In a still further possible embodiment of the apparatus according to the first aspect of the present invention, the apparatus comprises a current measurement unit which measures continuously the electrical current flowing to the connected load and notifies a control unit of the apparatus about the measured electrical current.

The current measurement unit can comprise a Hall sensor, a GMR sensor or a transformer.

In a further possible embodiment of the apparatus according to the first aspect of the present invention, the control unit is adapted to determine an operation state of the connected load on the basis of the current profile of the electrical current measured by the current measurement unit and/or an operation state of the apparatus and is further adapted to control the driver circuit upon deviation from a predetermined load operation range such that it switches automatically the power switch off within the switch-off period.

In a further possible embodiment of the apparatus according to the first aspect of the present invention, the control unit is adapted to control the driver circuit of the apparatus on reception of a control command such that the power switch is switched either on or off according to the received control command.

In a further possible embodiment of the apparatus according to the first aspect of the present invention, the control unit of said apparatus is adapted to receive the control command from a user interface of said apparatus, from a computer connected to said apparatus or from a stored program control of an automation system.

In a further possible embodiment of the apparatus according to the first aspect of the present invention, the power switch comprises an IGBT or a power MOSFET, in particular an SiC MOSFET, a GaN MOSFET or a ScAlN MOSFET.

In a further possible embodiment of the apparatus according to the first aspect of the present invention, the apparatus is adapted to derive based on at least one parameter of the connected load and on the current profiles measured by the current measurement unit a temperature profile of components of said load and/or of components of said apparatus and to control the driver circuit to switch off the power switch if a deviation from a predetermined temperature range is detected.

In a further possible embodiment of the apparatus according to the first aspect of the present invention, the power switch is switched on after a configurable wait period and/or after successful clearance of the switch-off cause and/or if other predetermined switch-on conditions are fulfilled.

In a further possible embodiment of the apparatus according to the first aspect of the present invention, the load comprises a multiphase motor which receives via the apparatus several electric current phases as operation currents.

In a further possible embodiment of the apparatus according to the first aspect of the present invention, for each electrical current phase at least one sensor component and an associated power switch connected in series with said sensor component is provided and controlled by an associated driver circuit of said apparatus.

The load can comprise in alternative embodiments also a resistive load or a capacitive load.

In a further possible embodiment of the apparatus according to the first aspect of the present invention, for each electrical current phase or DC current direction a first power switch is provided for a positive current half-wave of an AC current and a second power switch is provided for a negative current half-wave of the AC current.

In a further possible embodiment of the apparatus according to the first aspect of the present invention, a first power switch is provided for a positive DC current and a second power switch is provided for a negative DC current.

In a further possible embodiment of the apparatus according to the first aspect of the present invention, the power switches are connected via bridge rectifier circuits with associated driver circuits of said apparatus.

The voltage drop $\Delta U_4$ at the coil and/or the voltage drop $\Delta U_5$ can be supplied to the driver circuit. The voltage drop $\Delta U_4$, $\Delta U_5$ can be supplied as a sum voltage to the driver circuit or separately, i.e. in parallel.

In a further possible embodiment of the apparatus according to the first aspect of the present invention, the apparatus comprises a user interface adapted to signal an operation state of the apparatus and/or an operation state of the load.

In a further possible embodiment, the driver circuit comprises a low voltage side connected to the control unit and a high voltage side connected to the power switch, wherein the low voltage side and the high voltage side of the driver circuit are galvanically separated from each other.

The invention further provides according to a further aspect a method for switching and protection of a load comprising the features of claim 23.

The invention provides according to the second aspect a method for switching and/or protection of a load comprising the steps of:

generating directly a voltage drop along a sensor component corresponding to a current rise speed of an electrical current flowing via the sensor component and a power switch to said load and switching the power switch automatically off within a switch-off period if the generated voltage drop and/or a voltage drop along the power switch exceeds a threshold voltage.

The switch-off period is defined by the signal propagation delays within the hard-wired driver circuit and comprises in any case less than 1 millisecond. A switch-off period of less than 5 microseconds can be achieved.

In the following, possible embodiments of the different aspects of the present invention are described in more detail with reference to the enclosed figures.

Figure 1:
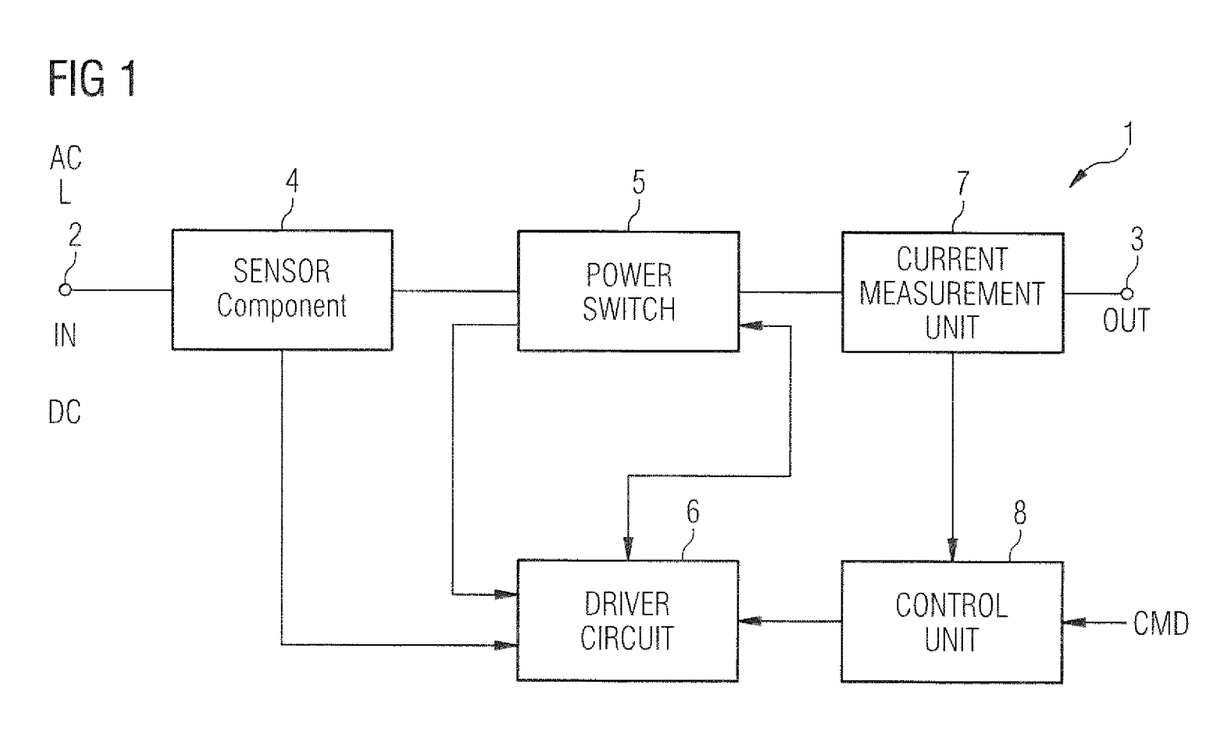
FIG. 1 shows a block diagram of a possible exemplary embodiment of a protection apparatus according to the first aspect of the present invention.
Figure 6:
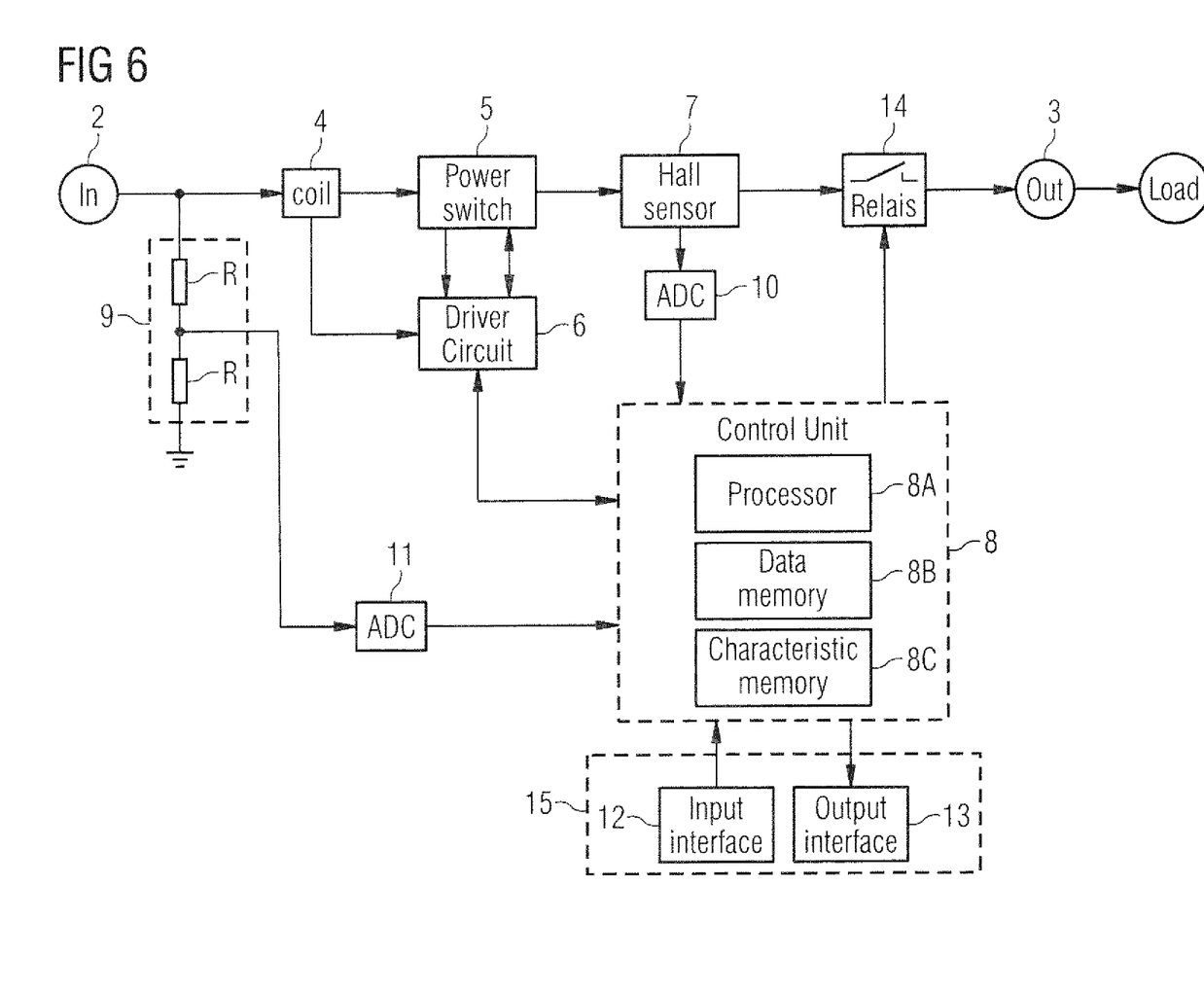
FIGS. 6-8 show block diagrams of a further exemplary embodiment of a protection apparatus according to the first aspect of the present invention.
Figure 7:
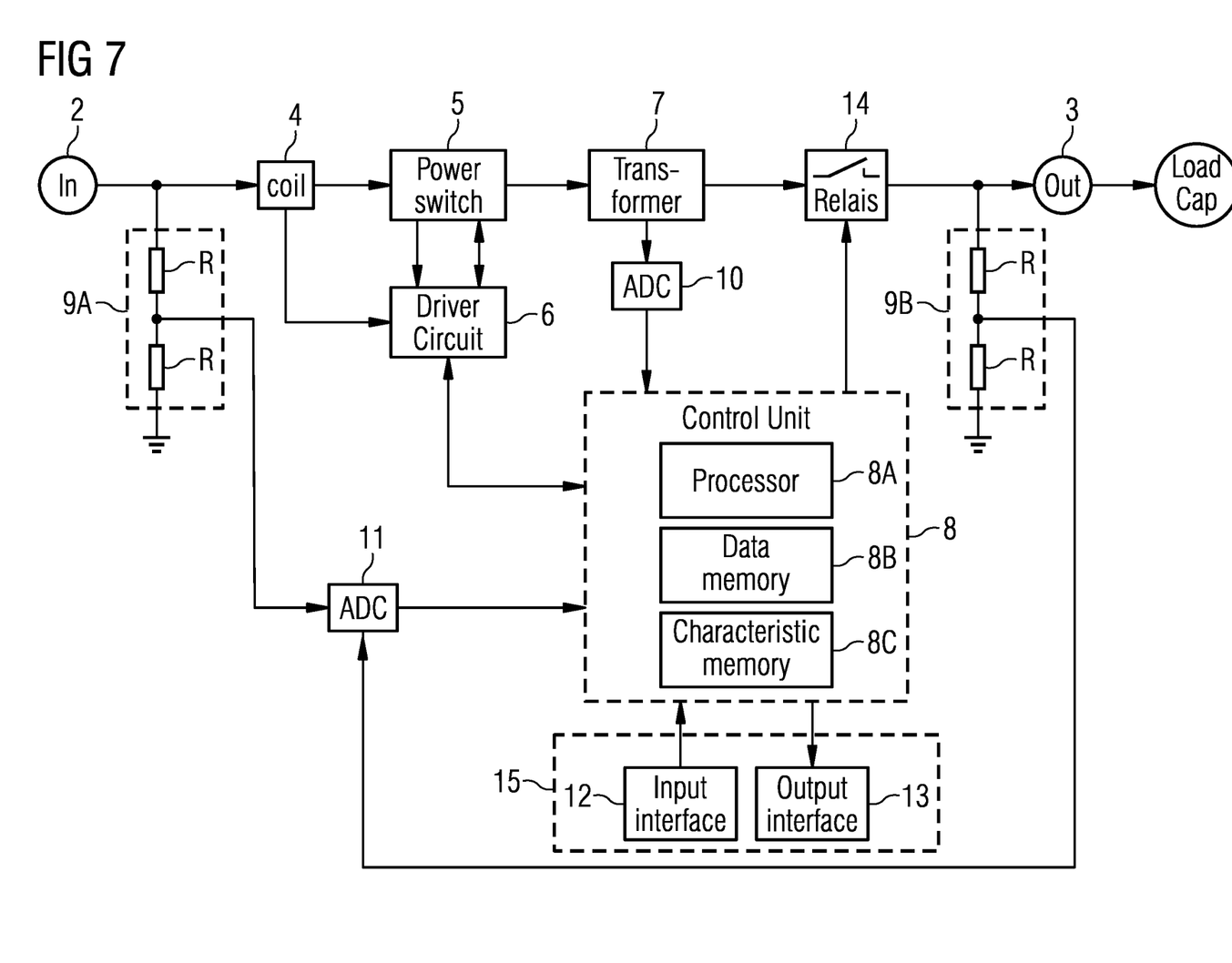
Figure 8:
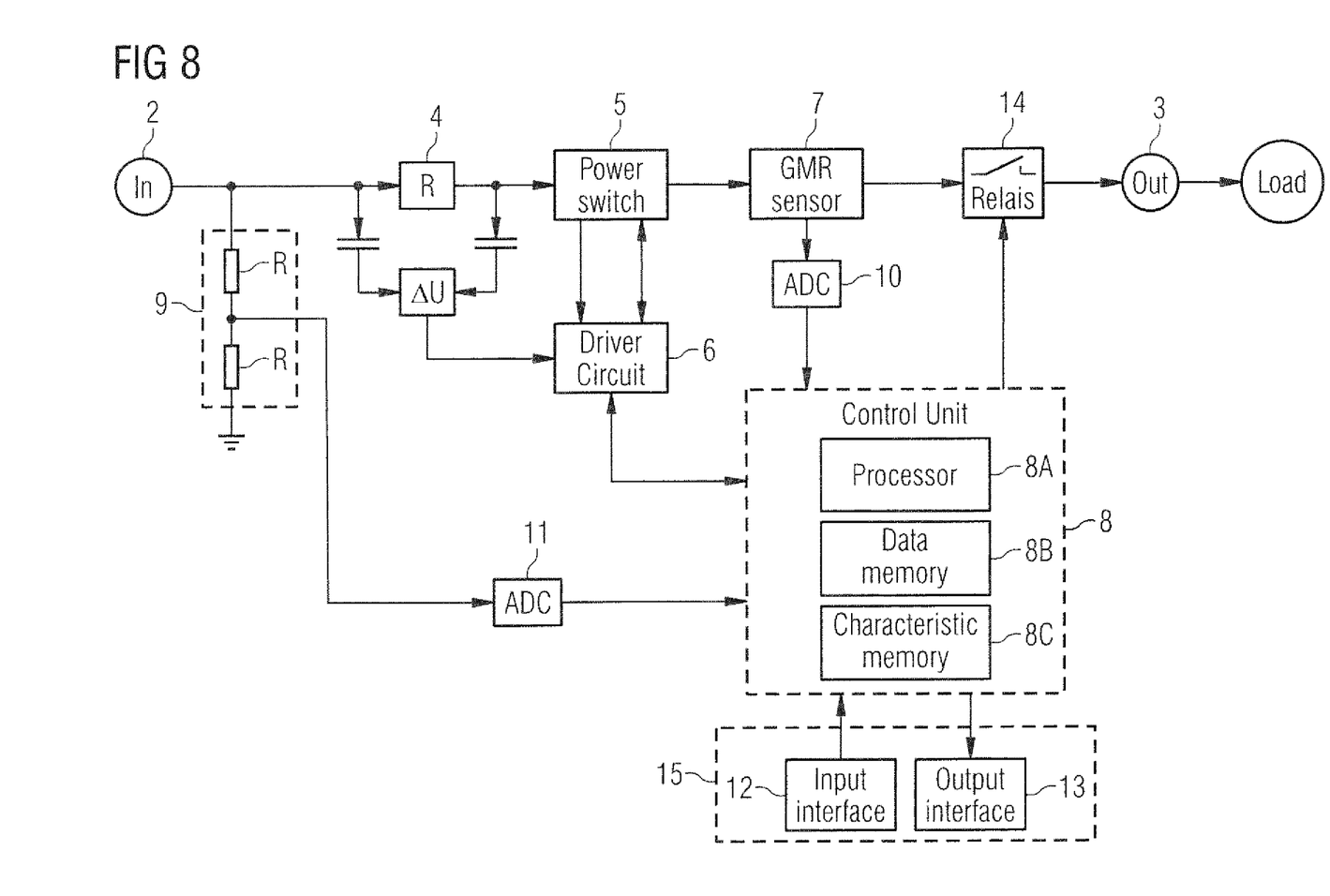

As can be seen from the block diagram of FIG. 1, an apparatus 1 according to the present invention can be provided for switching and/or protection of a load connected to the apparatus 1. In the illustrated embodiment, the apparatus 1 comprises an input terminal 2 to receive an electrical current phase L (AC) from a power supply system PSN. In a possible use case, the input terminal 2 can also receive a DC current. The apparatus 1 comprises in the illustrated embodiment an output terminal 3 to connect an external load to the protection apparatus 1. The load can be for instance an inductive load such as an electrical motor. The load can also comprise a resistive load or a capacitive load. The apparatus 1 comprises a sensor component 4 connected in series with a power switch 5. The power switch 5 comprises in a preferred embodiment a semiconductor power switch controlled by an associated driver circuit 6 as illustrated in FIG. 1. The power switch 5 can comprise in a possible embodiment an IGBT or a power MOSFET, in particular an SiC MOSFET, a GaN MOSFET or a ScAlN MOSFET. A possible embodiment of a driver circuit 6 is illustrated in the block diagram of FIG. 4. The electrical current I supplied to the input terminal 2 of the apparatus 1 flows through the sensor component 4 and the power switch 5 to at least one load connected to the apparatus 1. In the illustrated exemplary embodiment of FIG. 1, the apparatus 1 further comprises a current measurement unit 7 which is adapted to measure the electrical current I flowing to the connected load. The current measurement unit 7 notifies a control unit 8 of the apparatus 1 about the measured electrical current. The current measurement unit 7 can comprise a Hall sensor as illustrated in the embodiment of FIG. 6. Also a transformer can be used as a current measurement unit 7 as shown in FIG. 7. A further alternative is the use of a GMR sensor as shown in the embodiment of FIG. 8.

Figure 3:
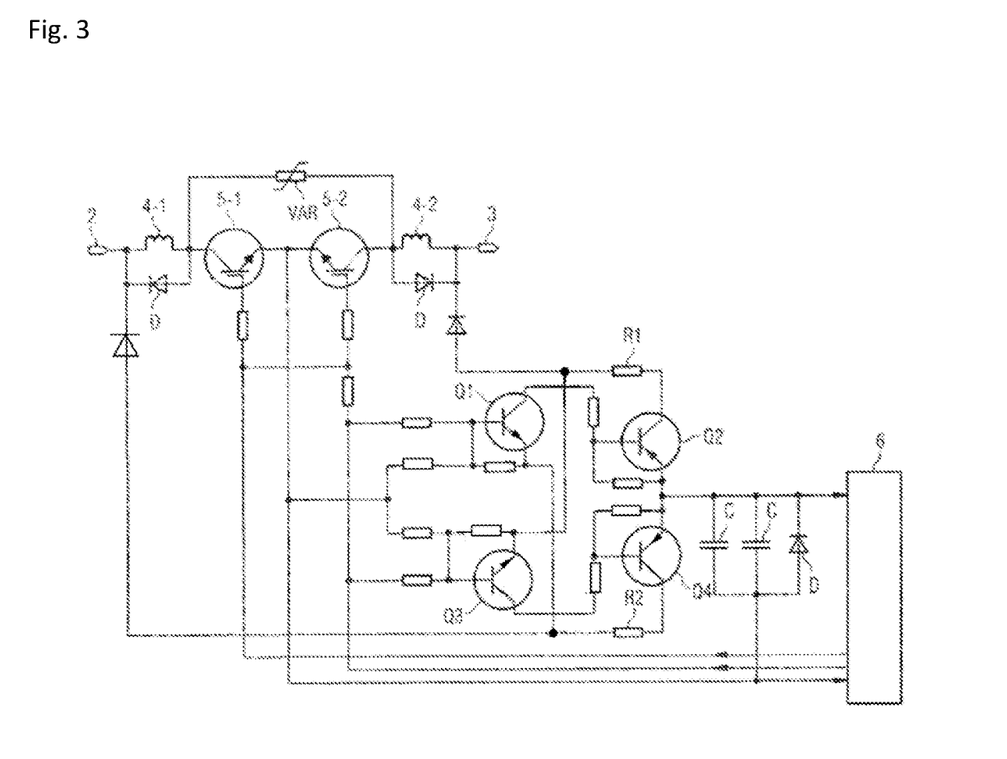
FIG. 3 shows a circuit diagram of a possible exemplary embodiment of a protection apparatus according to the present invention.
Figure 4:
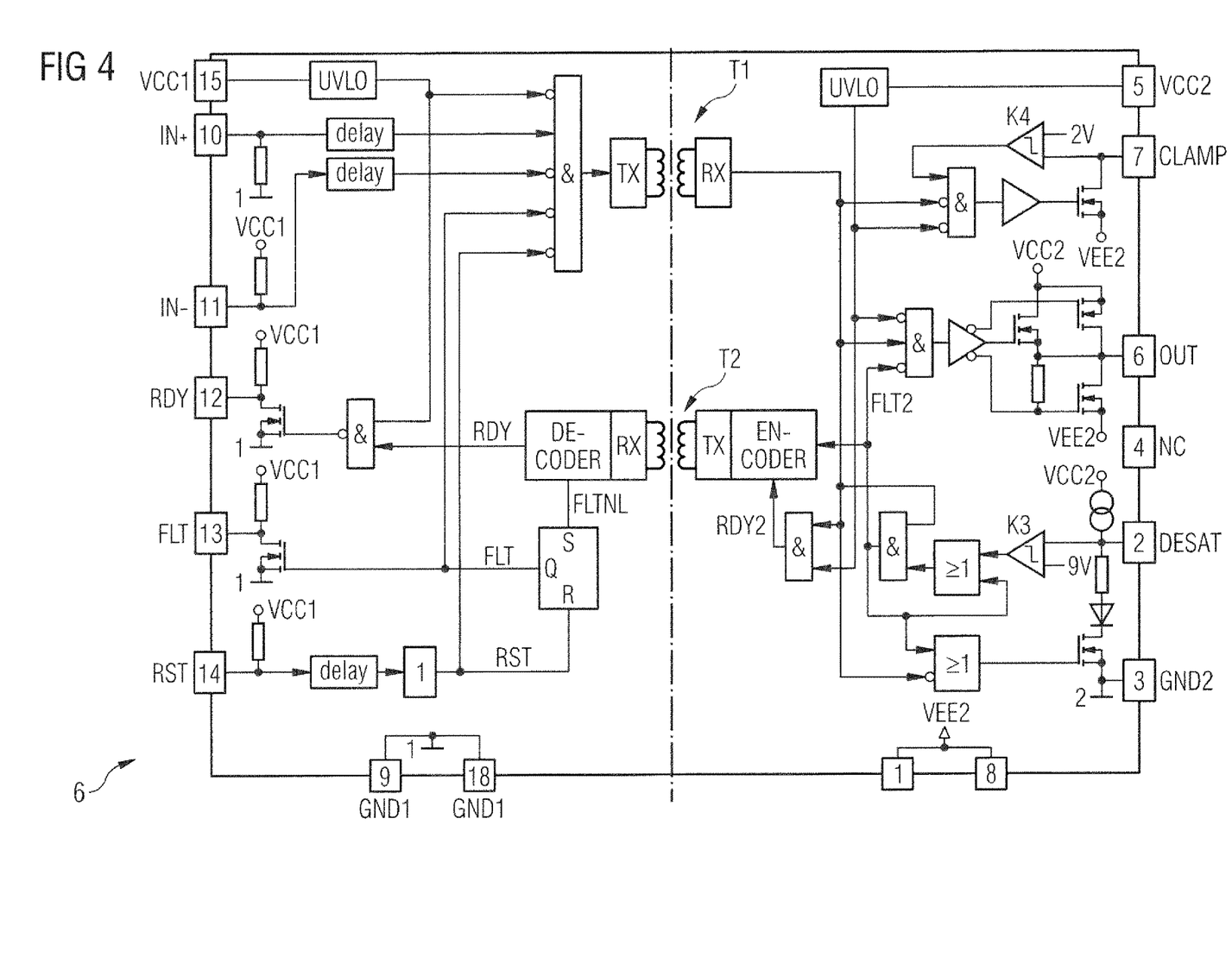
FIG. 4 shows a flowchart of a possible exemplary embodiment of a method for load protection according to a further aspect of the present invention.

The hardware sensor component 4 connected in series with the power switch 5 is adapted to generate an electrical voltage corresponding to a current rise speed of the electrical current I flowing via the sensor component 4 and via the power switch 5 to the load connected to the output terminal 3 of the apparatus 1. The driver circuit 6 is adapted to detect an occurring overcurrent, in particular a short circuit current, depending on the voltage drop $\Delta U_4$ generated directly by the sensor component 4 and to switch off the power switch 5 automatically upon detection of an overcurrent within a very short period of time to protect the connected load. The sensor component 4 comprises in a possible embodiment a coil which is adapted to generate directly an induction voltage $\Delta U_4$ depending on a change of the electrical current I flowing through the sensor component 4 and through the power switch 5 to the connected load. The induction voltage $\Delta U_4$ generated by the coil 4 corresponds to the current rise speed dI/dt of an electrical current I flowing via the sensor 4 and via the power switch 5 to the respective load. The voltage drop $\Delta U_4$ generated by the sensor component 4 and the voltage drop, $\Delta U_5$ along the power switch 5 can be applied in the illustrated embodiment as a sum voltage $U_\Sigma$ to the driver circuit 6 ($U_\Sigma = \Delta U_4 + \Delta U_5$). In case that the power switch 5 is implemented by a MOSFET, the voltage drop $\Delta U_5$ along the power switch 5 corresponds to the drain-source voltage $U_{DS}$. The sensor component 4 does not only measure the current rise speed dI/dt but also provides protection of the power switch 5 by limiting the voltage drop, e.g. the drain-source voltage of a MOSFET 5. The driver circuit 6 is adapted to determine based on the applied sum voltage $U_\Sigma$ an occurring short circuit current and/or an overload of the power switch 5 and is adapted to switch off the power switch 5 upon detection of an overcurrent and/or upon detection of an overload of the power switch to protect both the connected load and/or to protect the power switch 5 of the apparatus 1 within a short switch-off period of less than 1 millisecond, preferably less than 5 microseconds. In a preferred embodiment, the driver circuit 6 can switch off the power switch 5 within a switch-off period of less than 2 microseconds if the applied sum voltage exceeds a predetermined threshold voltage $U_{TH}$. The switch-off period is predefined by the connection circuitry as illustrated in FIG. 3 connecting the driver circuit 6 with the sensor components 4-1, 4-2, in particular it is defined by the capacity of the capacitor C and by the internal circuitry of the driver circuit 6 as illustrated in FIG. 4, i.e. by the signal propagation delays caused by the gates and comparators of the driver circuit 6. In a possible embodiment, the threshold voltage $U_{TH}$ can be configurable. If the applied sum voltage $U_{93}$ exceeds the configured threshold voltage $U_{TH}$ the driver circuit 6 does switch off automatically the power switch 5 within a short switch-off period of less than 5 microseconds, preferably within a period of less than 2 microseconds. In a possible embodiment, the sensor component 4 comprises a coil adapted to measure the current rise speed (dI/dt) of the electrical current flowing via the sensor component 4. The sensor component 4 generates directly an induction voltage $\Delta U_4$ proportional to the change of the electrical current (dI/dt) flowing through the coil 4. In a possible embodiment, if the electrical current I has a current rise speed of around 5 Ampere per microsecond the generated induction voltage $U_L$ applied to the driver circuit 6 is sufficient to trigger a switch-off operation of the power switch 5 connected in series to the sensor component 4. The inductivity L of the coil 4 is adapted individually to the physical limitations of the used power switch 5. In a possible embodiment, a parasitary inductivity of the power switch 5 can be used to provide a voltage drop $\Delta U_4$ supplied to the driver circuit 6. The hardware sensor component 4 is very robust against environmental influences and does not involve any electronic circuits to generate the sense voltage $U_L$. Consequently, the probability that the hardware sensor component 4 fails during operation of the apparatus 1 is very low. The sensor component 4 can be connected in front of the power switch 5 as shown in FIG. 1 or behind the power switch 5. In contrast to electronic circuits such as differentiators, the use of a hardware sensor component, in particular a coil, makes the apparatus 1 extremely robust and increases its operation lifetime. The switch-off operation is performed by the driver circuit 6 without involving the relative slow control unit 8. Accordingly, the switch-off operation triggered by the electrical voltage generated physically by the sensor component 4 is performed by hardware components of the drive circuit 6 as also illustrated in the block diagram of FIG. 4. The sensor component 4 is very sensitive and generates a sense voltage even before an electrical load current $I_L$ flowing to the load reaches a high current level which potentially can damage components of the connected load. Accordingly, the protection apparatus 1 as illustrated in the block diagram of FIG. 1 can be faster by at least a factor of about 50 than conventional protection devices. A very fast switch-off operation provided by the hardware driver circuit 6 does guarantee that only a small portion of electrical energy is transferred to the connected load in case of an overcurrent or short current scenario. Accordingly, even sensitive electrical components of the connected load are protected efficiently by the protection apparatus 1 according to the present invention. The apparatus 1 according to the present invention does not only protect the electrical components of the connected load but also the power switch 5 integrated in the apparatus 1. Accordingly, the apparatus 1 as illustrated in FIG. 1 also provides self-protection. The electrical power at the power switch is limited in a possible embodiment to 80% of a predetermined operation power.

After the power switch 5 has been switched off, it is possible to switch on the power switch 5 again in case that predetermined switch-on conditions have been fulfilled. After a successful clearance of the switch-off cause, the power switch 5 can be switched on again. Consequently, the apparatus 1 according to the present invention can be used again after a switch-off has been triggered. In a possible embodiment, the power switch 5 can be switched on again after a configurable wait period has expired and/or after successful clearance of a switch-off cause.

As illustrated in the block diagram of FIG. 1, a control unit 8 is adapted to control the driver circuit 6 in response to a control command CMD. The control unit 8 can receive a control command CMD either from a user interface of the apparatus 1 or from a remote device, in particular from a computer connected to the apparatus 1 or from a stored program control unit of an automation system. The current measurement unit 7 can for instance comprise a Hall sensor which is adapted to measure continuously the electrical current I flowing to the connected load and supplies the control unit 8 with the measurement values indicating the measured electrical current. In a possible embodiment, the control unit 8 is adapted to determine an operation state of the connected load on the basis of the current profile of the electrical current I measured by the current measurement unit 7. The control unit 8 can control the driver circuit 6 upon deviation from a predetermined load operation range such that it switches automatically the power switch 5 off. Further, the control unit 8 is adapted to control the driver circuit 6 of the apparatus 1 on reception of a control command CMD such that the power switch 5 is switched either on or off according to the received command CMD. Accordingly, the control unit 8 controls the normal switching on/switching off operations in response to a received command CMD or in case that the measured current profile indicates an overload of the connected load. However, the overcurrent triggered switch-off operation performed by the driver circuit 6 in response to the applied sum voltage has highest priority and can be performed very fast since it does not involve the control unit 8.

The control unit 8 can comprise a microprocessor which calculates the current state of the power switch 5, in particular the current dissipation power and/or operation temperature. The control unit 8 can issue a preemptive alarm in case that the monitored power of the power switch 5 or the temperature of the power switch 5 does exceed admissible limits. The control unit 8 may observe a trend of the power and temperature of the power switch 5 and trigger a switch-off in case that a critical range has been reached.

In the illustrated embodiment of FIG. 1, the apparatus 1 comprises a single input 2 and a single output 3. In a possible embodiment, the apparatus 1 can be used for a multiphase load receiving several current phases L1, L2, L3. For each current phase L, a separate sensor component 4 and an associated power switch 5 can be provided connected to an associated driver circuit 6. Accordingly, in a three-phase embodiment, the apparatus 1 according to the present invention comprises an associated driver circuit 6 for each current phase, i.e. a total of three driver circuits 6 each connected to a corresponding sensor element 4 and to a corresponding power switch 5. In a possible embodiment, for each electrical current phase L, a first power switch can be provided for a positive current half-wave of the applied AC current and a second power switch is provided for a negative current half-wave of the AC current. The first and second power switch can be connected via a bridge rectifier circuit with an associated driver circuit 6.

The applied current phase L can comprise a frequency of e.g. 50 to 60 Hz. In a possible embodiment, the sensor component 4 comprises a coil with an inductivity of less than 1 millihenry.

In a possible embodiment, the control unit 8 is programmable and can make use of a programmed model of the components implemented in the connected load and/or implemented in the apparatus 1 itself. In a possible embodiment, model parameters of the employed model can be configured. These parameters can for instance comprise the normal operation current of the connected load as well as the tripping class of the connected load. In a possible embodiment, the control unit 8 is adapted to derive based on the current profiles measured by the current measurement unit 7 and based on at least one parameter of the connected load a temperature profile of components of the connected load and/or of components of the apparatus 1 and can control the driver circuit 6 to switch off the power switch 5 if a deviation from a predetermined temperature range is detected. The parameter can e.g. comprise a set current or a tripping class of the load. Further, the control unit 8 can be programmed with a configurable wait period. For instance, depending on the derived temperature profile, a corresponding wait period has to be expired before the power switch 5 can be switched on again. The apparatus 1 as illustrated in the block diagram of FIG. 1 can be used for any kind of loads, i.e. inductive loads, capacitive loads or ohmic loads. The load comprises one or more load parameters. The load can be for instance a motor having a motor power of e.g. 1.5 kW, a supply voltage of 400 Volt, a nominal current of 3.6 Amp with a tripping class 10. The connected load is separated from the power supply before the electrical current I reaches a high current level or amplitude. The driver circuit 6 can operate independently from the control unit 8 to switch off an associated power switch 5 within a brief reaction time in case that the applied sum voltage exceeds a configurable threshold voltage $U_{TH}$. The voltage drop $\Delta U_5$ along the power switch 5 corresponds to the amplitude or level of the flowing electrical load current. The voltage drop $\Delta U_4$ along the sensor component 4 corresponds to the current rise speed of the electrical current flowing via the sensor component 4 and via the power switch 5 to the respective load. In critical operation states, both voltage drops are added and applied to the driver circuit 6 so that a critical operation state can already be detected in the initial phase of its occurrence. The application of a sum voltage $U_\Sigma$ to an integrated driver circuit chip 6 as shown in FIG. 4 requires only one input pin of the chip, thus promoting miniaturization of the apparatus 1.

The driver circuit 6 controls an associated power switch 5 which comprises in a preferred embodiment a Gallium nitride MOSFET having a high voltage endurance of at least 800 Volts in the switch-off state and having a low impedance in its switch-on state. In a further possible embodiment, the power switch 5 can also comprise a SiC power MOSFET or a ScAlN MOSFET.

Figure 5:
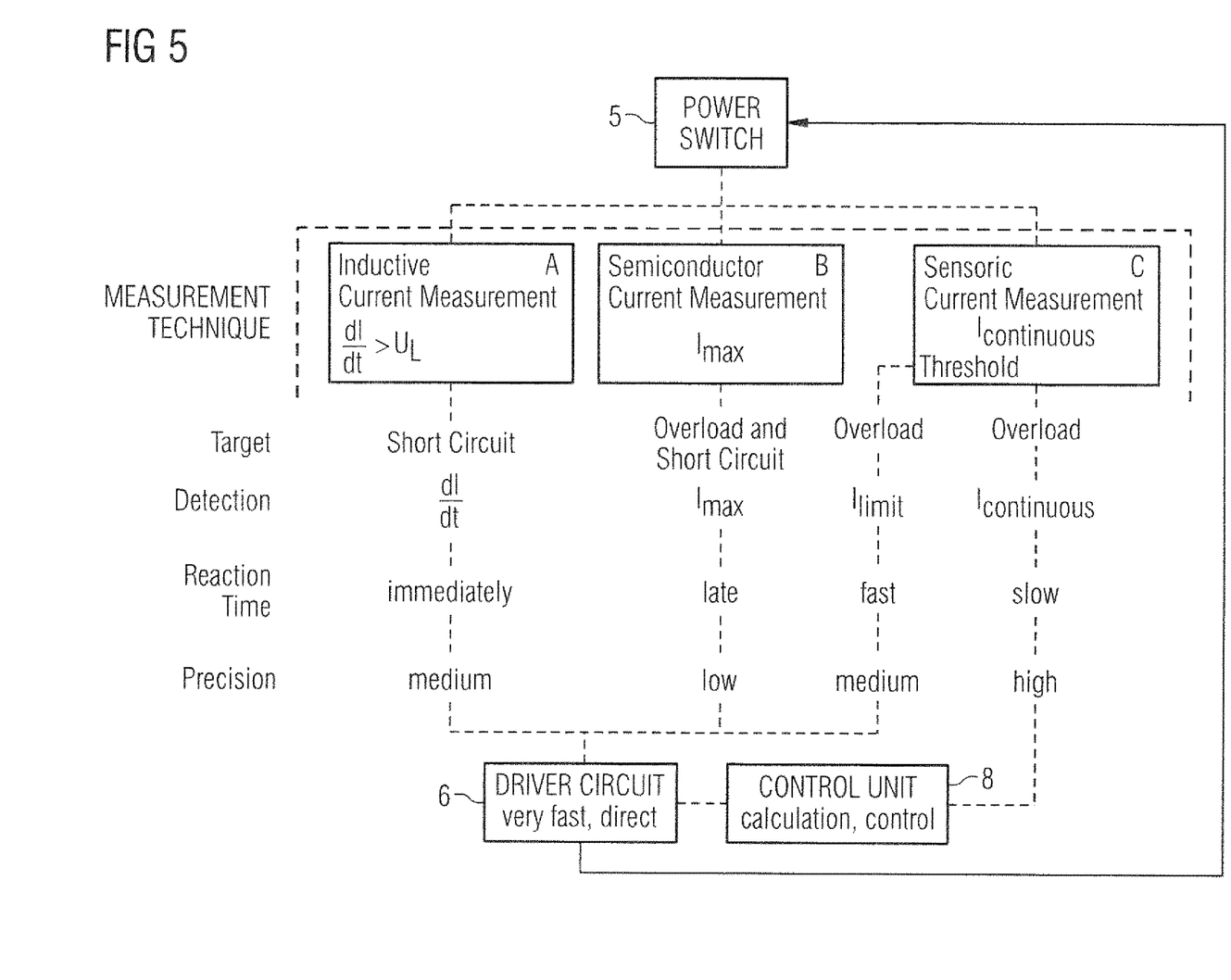
FIG. 5 shows schematically the different redundant measuring and protection mechanisms employed by the method and apparatus according to the present invention.

As also illustrated in FIG. 5, the apparatus 1 comprises several redundant protection mechanisms using different measurement techniques.

The apparatus 1 as illustrated in FIG. 1 and FIG. 5 comprises several protection mechanisms, in particular a first protection mechanism provided by the sensor component 4, a second protection mechanism provided by the voltage drop along the power switch 5 and a third protection mechanism provided by the current measurement unit 7. In case of a short circuit current, the sensor component 4 and the power switch 5 trigger the driver circuit 6 to perform a very fast switch-off operation. The current measurement unit 7 further provides protection in case of overload. Accordingly, the protection apparatus 1 provides an electronic overload and overcurrent protection which can be used again after the power switch 5 has been switched off, in particular after a programmable wait period has expired.

Figure 2:
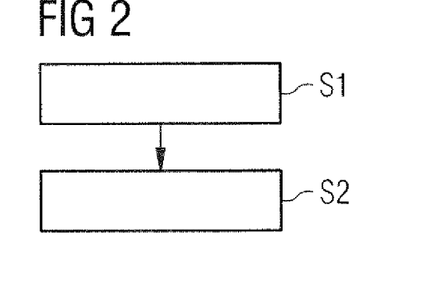
FIG. 2 shows a flowchart of a possible exemplary embodiment of a method for performing load protection according to the second aspect of the present invention.

FIG. 2 shows a flowchart of a possible exemplary embodiment of a method for switching and protecting load according to a further aspect of the present invention. In the illustrated embodiment, the method comprises two main steps.

In a first step S1, a voltage drop corresponding to a current rise speed of an electrical current I flowing via a power switch 5 to a load is generated directly at a sensor component 4. In a possible implementation, the sensed voltage drop can be generated by a sensor component 4, in particular by a coil. The sensed voltage drop is generated physically and instantaneously by a hardware sensor component 4 such as a coil. The sensor component 4 is physically adapted to the physical requirements of the associated power switch 5 connected in series with the sensor component 4. For instance, the inductance of a coil used as a sensor component is configured individually to the power limit of the respective power switch 5.

In a further step S2, the power switch 5 is switched off automatically if the voltage drop at the sensor component 4 plus a voltage drop along the power switch 5 itself exceeds a preconfigured threshold voltage Uni. The switching-off in step S2 is performed in a preferred embodiment very fast within a time period of less than 1 millisecond. With the driver circuit 6 illustrated in FIG. 4, a switching-off period of less than 5 microseconds and in a preferred embodiment of less than 2 microseconds can be achieved.

FIG. 3 shows a circuit diagram of a possible exemplary embodiment of an apparatus 1 for switching and/or protection of a load connected to the apparatus 1. In the illustrated embodiment, the apparatus 1 comprises an input terminal 2 to receive a phase current L from a current source having e.g. a voltage of 400 Volt. In the illustrated exemplary embodiment, there is a signal path from the input terminal 2 to the output terminal 3 comprising two pairs of power switches 5 and associated sensor components 4. The illustrated circuit of FIG. 3 is symmetrical for positive current half-waves and negative current half-waves of an AC current supplied to the apparatus 1. Between the input terminal 2 and the output terminal 3 of the apparatus 1, a first coil 4-1 and a second coil 4-2 are provided. Each coil 4-1, 4-2 comprises an associated power switch 5-1, 5-2 as illustrated in the circuit diagram of FIG. 3. In the illustrated exemplary implementation, both coils 4-1, 4-2 have an inductivity of 2.2 microhenry. In the illustrated embodiment, the power switches 5-1, 5-2 are implemented by power MOSFETs. A varistor VAR can be provided in a possible implementation to eliminate disturbances. In the illustrated implementation, diodes D can be connected in parallel to each coil 4-1, 4-2 to reduce self-induction. The power switches 5-1, 5-2 are connected to a bridge rectifier circuit comprising in the illustrated embodiment two pairs of complementary transistors $Q_1$ to $Q_4$. At the output side of the bridge rectifier circuit, capacitors C can be provided to provide a predetermined minimal delay. This delay has an influence on the switch-off period. In a possible embodiment the capacity of the capacitor C can be adjustable to adapt the switch-off period.

Both resistors R1, R2 comprise a resistance which can be configured to adjust the sensitivity of the circuit illustrated in FIG. 3. As can be seen in FIG. 3, the driver circuit 6 is connected to the output of the bridge rectifier circuit to receive the sum voltage of power switch 5-1 or 5-2 and sensor component 4-1 or 4-2 and to apply in return control voltages to the gates of the two illustrated power switches 5-1, 5-2. The driver circuit 6 is adapted to detect an occurring overcurrent, in particular a short circuit current, depending on the voltages generated directly by the sensor component 4-1 or the sensor component 4-2 and to switch off the associated power switch 5-1 or 5-2 upon detection of a short circuit current flowing through the current path between input terminal 2 and output terminal 3 within a brief period of time to protect any load connected to the output terminal 3 of the apparatus 1.

FIG. 4 shows a block diagram of a possible exemplary embodiment of the driver circuit 6 used in the apparatus 1 according to the present invention. In the illustrated exemplary embodiment, the driver circuit 6 comprises a single IGBT driver IC 1ED020/12-B2 manufactured by Infineon Technologies. As can be seen from the block diagram of FIG. 4, the driver circuit 6 comprises two separate circuit halves galvanically separated by transformers T1, T2. The left side of the driver circuit 6 illustrated in FIG. 4 is connected to the control unit 8 to receive control signals from the control unit 8, in particular in response to control commands CMD or depending on measured current profiles. The low voltage side on the left side of the circuit diagram of FIG. 4 is connected via transformers to the high voltage side provided on the right side of the circuit illustrated in FIG. 4. The sum voltage consisting of the voltage drop along the sensor component 4 and the voltage drop along the power switch 5 is applied to the DESAT input pin of the driver circuit 6 and compared by a comparator K3 with a configurable threshold voltage $U_{TH}$ of e.g. 9 Volt as illustrated in FIG. 4. If the configurable threshold voltage is exceeded, a binary signal travels through several gates to drive an operational amplifier and to generate a control switch-off signal output to the gates of the power MOSFETs 5-1, 5-2 to switch both power MOSFETs off within a very short reaction time of less than 5 microseconds. The driver circuit 6 illustrated in FIG. 4 comprises two galvanically separated parts. The driver circuit 6 can be connected to a standard 5 Volt DSP or microcontroller forming part of the control unit 8 wherein CMOS in/outputs are connected to a low voltage side. As can be seen from the circuit diagram of FIG. 4, a switch-off loop used to switch off the power switches 5-1, 5-2 in response to the applied sum voltage is provided only at the high voltage side of the driver circuit 6 so that the reaction time is very short because of the small propagation times of the logical signals via the logical gates of the high voltage part of the driver circuit 6. The switch-off protection loop does not include the control unit 8 used mostly for normal switching on/switching-off operations in response to received switch-on/switch-off commands CMD.

In a possible embodiment, the sensor component 4 and the power switch 5 as well as the driver circuit 6 can be provided on a common printed circuit board.

In a possible embodiment, the sensor component 4 can be implemented by another component than a coil, in particular by a resistor R as shown in the embodiment of FIG. 8 with a corresponding local measurement circuit adapted to generate directly an electrical voltage U corresponding to a current rise speed of an electrical current I flowing through the respective sense resistor. The resistor can be a NTC or PTC resistor. The resistance of the used resistor 4 can be temperature-dependent. Also, the temperature dependent resistance can be configured individually to the physical limitations of the associated power switch 5.

In a further possible embodiment, a data model of the connected load can be stored in a memory and evaluated by a processor of the control unit 8 to provide overload protection of the connected load. In a possible embodiment, the apparatus 1 can comprise a user interface adapted to signal a current operation state of the apparatus 1, in particular of its power switches. In a possible implementation, the user interface can indicate what safety mechanism has been triggered the switching-off of the integrated power switch 5. In this implementation, a user or operator of the automation system can be informed whether the switching-off of the power switch 5 was caused by a detected high current rise speed of the electrical current or because of a determined or detected overload of the power switch 5 or caused by an overload detection in view of the current profiles measured by the current measurement unit 7. In a still further possible embodiment, information about the cause of the switching-off of the power switch 5 can also be output via a data interface of the apparatus 1, for instance to a remote controller of an automation system including the protected load connected to the apparatus 1. In a still further possible embodiment, the protection apparatus 1 can comprise a local data memory to store log data. The log data can comprise data about switch-off operations performed during operation of an automation system or during operation of a connected load. In a possible embodiment, the memorized log data can be evaluated to analyze critical operation states having occurred during operation of the automation system.

In a possible embodiment, a relay circuit 14 can be connected in series with the power switch 5. The relay circuits can be used to change the sequence of power supply phases and to provide a galvanic separation. During a switch-off operation controlled by the driver circuit 6 or by the control unit 8, the power switch 5 is switched off before the associated relay circuit, whereas during a switch-on operation under control of the driver circuit 6 or the control unit 8 the relay circuit is switched on before the power switch 5. This does minimize the contact wear of the relay circuit 14 and increases safety against failure of the power switch 5. Further, this switch on and switch off sequence makes it possible to detect failures of the power switch 5.

In a further possible embodiment, different models for different loads can be uploaded to a configuration memory of the control unit 8 to provide matching load protection for the respective load depending on the measured current profiles and depending on at least one load parameter of the connected load. In a possible embodiment, the data models can be downloaded from a central database connected to the control unit 8 via a data network. Depending on the type of the connected load, different corresponding data models can be loaded into the configuration memory of the control unit 8 and evaluated in view of the measured current profiles provided by the current measurement unit 7.

FIG. 5 shows schematically the operation architecture of the apparatus 1 according to the present invention comprising redundant protection mechanisms and different measurement techniques to provide overload protection and overcurrent protection for the apparatus 1 itself, in particular its power switch 5, and also for the load connected to the apparatus 1. The different redundant protection mechanisms differ in what they detect ( $$\frac{dI}{dt},$$

$I_{max}$, $I_{limit}$, $I_{continuous}$), their respective reaction times and the measurement precision as also illustrated in FIG. 5. Even if one protection mechanism may fail, another protection mechanism can still be applied.

FIG. 6 shows a block diagram of a further possible exemplary embodiment of an apparatus 1 according to the first aspect of the present invention. In the illustrated embodiment of FIG. 6, the apparatus 1 comprises at the input terminal 2 a further sensor component 9 formed by a voltage divider adapted to supply a fraction of the supply voltage U at the input terminal 2 of the apparatus 1 via an analog-to-digital converter 11 to the control unit 8 of the apparatus 1 to provide a supply voltage profile over time. Further in the embodiment of FIG. 6, the current measurement unit 7 is formed by a Hall sensor. The measured load current $I_L$ flowing to the connected load is notified by the Hall sensor 7 via an analog-to-digital converter 10 to the control unit 8 of the apparatus 1. The control unit 8 is adapted to determine an overload state of the connected load on the basis of the measured load current profile. The current measurement unit 7 can also provide measurements to the driver circuit 6 for fault detection. The control unit 8 of the apparatus 1 shown in FIG. 6 is adapted to control the driver circuit 6 to switch off the power switch 5 automatically if an overload state of the electrical load has been determined by the control unit 8. As can be seen in FIG. 6, the Hall sensor 7 and the sensor component 9 are both connected to associated analog-to-digital converters 10, 11. The analog-to-digital converters 10, 11 are adapted to convert the measured analog load current profile received from the Hall sensor 7 and the measured supply voltage profile measured by the sensor component 9 into corresponding measurement values (samples). The measurement values provided by the analog-to-digital converters 10, 11 are stored in a possible embodiment as data samples in a data memory 8B of the control unit 8 as load current profile data and as supply voltage profile data. The sampling rate may differ depending on the use case. In a possible embodiment the sampling rate of the ADCs 10, 11 is 4 kHz. Also the resolution can vary. In a possible implementation the ADCs 10, 11 comprise a resolution of at least 12 bits. The ADCs 10, 11, can also be integrated in a processor of the control limit 8. In the illustrated embodiments of FIGS. 6, 7, 8 the control unit 8 comprises a processor or FPGA 8A and a data memory 8B adapted to store on the fly during operation load current profile data and supply voltage profile data. The control unit 8 can further comprise a memory 8C to store different operation characteristics, i.e. operation characteristics of different operation parameters and/or for different types of loads. Depending on the type of load, i.e. inductive load, resistive load or capacitive load, different operation characteristics for different use cases can be stored in the characteristics memory 8C of the control unit 8 illustrated in FIGS. 6, 7, 8. In a possible embodiment, the control unit 8 can also perform a power supply control of the electrical power supplied to the load connected to the output terminal 3 of the apparatus 1. In a possible implementation, the electrical power supply of the electrical load can be performed by the processor 8A of the control unit 8 depending on an operation mode and/or a type of the connected electrical load on the basis of the load current profile measured by the Hall sensor 7 and on the basis of the supply voltage profile measured by the sensor component 9. In a possible implementation, the processor 8A of the control unit 8 can calculate a power factor cos φ on the basis of the load current profile data and the supply voltage profile data stored in the data memory 8B of the control unit 8. The profile data can be stored for a predetermined moving time window in the data memory 8B. In a possible embodiment the processor 8A can be substituted by a FPGA circuit.

In a possible embodiment, the processor 8A of the control unit 8 is adapted to determine an operation mode and/or a specific operation state of the connected electrical load by processing the load current profile data and/or the supply voltage profile data available in the data memory 8B of the control unit 8.

In a further possible embodiment of the apparatus 1 illustrated in the embodiment of FIG. 6, the processor 8A of the control unit 8 is adapted to perform a phase angle control and/or to apply a predefined switch pattern to the power switch 5 directly or via the driver circuit 6 depending on the calculated power factor cos φ and a current operation mode and/or a type of the electrical load connected to the output terminal 3 of the apparatus 1. To this end, the processor 8A of the control unit 8 can have access to operation characteristics of the respective electrical load indicating for operation parameters at least one admissible operation zone, at least one critical operation zone and/or at least one inadmissible operation zone.

In the embodiments illustrated in FIGS. 6, 7, 8 the apparatus 1 further comprises a relay circuit 14 connected also in series with the power switch 5. In the illustrated embodiment of FIG. 6, the relay circuit 14 is provided at the output terminal 3 between the Hall sensor 7 and the connected load. Relay circuits for different phases can be used to change a sequence of power supply phases and/or to provide a galvanic separation. The relay circuit 14 is controlled by the control unit 8 as shown in FIG. 6. In a possible implementation, during a switch-off operation controlled by the driver circuit 6 or by the control unit 8, the power switch 5 can be switched off before the associated relay circuit 14, whereas during a switch-on operation under control of the driver circuit 6 or under control of the control unit 8, the relay circuit 14 is switched on before the associated power switch 5. This does minimize a contact wear of the relay circuit 14 and does increase the safety against failure of the power switch 5. Further, the switch-on and switch-off sequences make it possible to determine failures of the power switch 5.

As can be seen in the embodiment of FIG. 6, the sensor component 4, the power switch 5, the Hall sensor 7 and the relay circuit 14 are all connected in series in a current path between the input terminal 2 and the output terminal 3. The sequence of serial connected elements can vary in different embodiments. For instance, the coil 4 shown in FIG. 6 may be provided between the power switch 5 and the Hall sensor 7. Also, several components can be provided redundantly, in particular components can be connected in parallel to each other to provide safety against failure of an electronic component. For instance, more than two coils 4 can be connected in parallel in a possible implementation. Also, two or more power switches 5 can be connected in parallel in a possible implementation of the apparatus 1. The same applies to the current measurement unit 7, i.e. several current measurement units 7 can be connected in parallel in a possible embodiment of the apparatus 1 shown in FIG. 6.

Further embodiments are possible. In a possible embodiment as shown in FIG. 7, a voltage divider circuit 9B similar to the circuit 9 illustrated in FIG. 6 can also be provided at the output terminal 3 to provide a fraction of the output supply voltage via the ADC 11 to the control unit 8 of the apparatus 1. The provision of such an additional voltage divider 9B at the output terminal 3 can be required if the connected load is a capacitive load connected to the output terminal 3 of the apparatus 1.

An example of such a capacitive load is a compensation equipment adapted to compensate reactive power in a facility. If the connected load is a capacitive load it has to be checked by the control unit 8 whether the input voltage Vin at the input terminal 2 is equal to the output voltage Vout at the output terminal 3 before switching on the connected capacitive load. Accordingly, if the measured input voltage received from the sensor component 9A corresponds to the voltage received from the other voltage divider 9B at the output terminal 3, the connected capacitive load can be switched on. On the contrary, if the two measured voltages are different switching on of the capacitive load can be suppressed by the control unit 8.

In the embodiment of FIG. 7 a transformer 7 is used to provide current measurements to the Analog-to-Digital converter 10.

In a further possible embodiment, the voltage dividers 9A, 9B can provide measurement values which can be evaluated by the processor 8A of the control unit 8 to provide protection of the load against a too low or a too high supply voltage. If the voltage measured by the voltage divider 9A notified to the control unit 8 via the analog-to-digital converter 11 is less than a predefined low threshold voltage, a too low supply voltage is detected by the control unit 8 which may trigger a switch-off operation by means of the power switch 5. Further, if the measured supply voltage provided by the sensor component 9A and supplied to the control unit 8 via the analog-digital converter 11 exceeds another high threshold voltage, the control unit 8 can determine that the supply voltage for the connected load is too high so that a switch-off of the power switch 5 under control of the control unit 8 is automatically triggered. A similar control can be performed using the measurement values of the other voltage divider 9B.

The apparatus 1 as shown in FIG. 6 leads to a fast switch-off of a load or a facility connected to the output terminal 3 so that in any event the supplied electrical currents are less than 100 Amperes. In this way, the connected load or facility is always treated with care and preserved against wearout or damages.

Further embodiments of the apparatus 1 illustrated in FIG. 6 are possible. In a possible implementation, the driver circuit 6 can be integrated in the control unit 8 of the apparatus 1. Further, some electrical components can be provided outside the housing of the apparatus 1. For example, the relay circuit 14 might be connected between the output terminal 3 and the connected load. Also, the sensor components can be either integrated in a housing of the apparatus 1 or be implemented by external sensor components connected to the housing of the apparatus 1.

For different use cases or applications, different operation characteristics can be loaded into the memory 8C. These operation characteristics can for instance comprise operation characteristics of fuses or circuit breakers. A user interface 15 can be provided in the housing of the apparatus 1 or can be connected to the housing of the apparatus 1 via data interface connection. This user interface 15 can comprise keys or buttons or levers as input elements of the input interface 12 or optical display elements of the output interface 13. In a possible embodiment, the output interface 13 may indicate a current operation state of the apparatus 1 and/or of the load connected to the apparatus 1. The output interface 13 can also comprise elements indicating what kind of operation characteristics has been currently activated for operation. Accordingly, in a possible embodiment, the characteristics memory 8C can be adapted to store different kinds of operation characteristics for different use cases and/or for different kinds of loads connected to the apparatus 1. A user can activate a specific operation characteristic by corresponding input commands into the input interface 12. The selected operation characteristics can be displayed to the user by means of optical elements of the output interface 13. In a possible implementation, in the housing of the apparatus 1 a receiving slot can be provided to receive a memory card or a USB stick comprising a characteristics memory 8C with one or more operation characteristics for different loads and/or use cases. Accordingly, in this embodiment, the characteristics memory 8C can be integrated in a replaceable data carrier.

The apparatus 1 illustrated in the embodiments of FIGS. 1, 6 can in a possible implementation also be integrated into a load connected to a power supply network PSN. The apparatus 1 can also be integrated into a device connected between the load and the power supply network PSN. This device can be for instance a motor starter device connected between a power supply network PSN and an inductive load, in particular a motor. The apparatus 1 can also be in a further embodiment integrated into a variable frequency controller device which is adapted to change the AC supply voltage received from the power supply network PSN into a AC voltage having a variable amplitude and/or variable frequency.

The apparatus 1 according to the present invention can also be integrated into a power supply source such as a battery. The apparatus 1 can be integrated in any kind of energy storage device adapted to store electrical energy. For instance, the apparatus 1 can be provided at the output of an electrical battery to which an electrical load is connected. The apparatus 1 can also be provided at the input side of an energy storage, in particular for protecting a loading process of the energy storage from a power supply network PSN.

Further embodiments are possible. In a possible embodiment, the apparatus 1 as illustrated in the block diagram of FIGS. 1, 6, 7, 8 can also be integrated in a housing corresponding to the housing of a conventional fuse element. In this way, the protection apparatus 1 according to the present invention can be used to substitute an existing fuse component received by a fuse holder of an electronic circuit.

The protection apparatus 1 according to the present invention as illustrated in FIGS. 1, 6, 7, 8 can be connected to a busbar system of a power supply network PSN. For instance, the input terminal 2 can be connected directly or indirectly via an adapter to a busbar of a busbar system to receive electrical power supply. The apparatus 1 can also be used to provide protection against lightning. Corresponding operation characteristics can be stored in the characteristics memory 8C of the control unit 8. The apparatus 1 can also be mounted directly or indirectly via an adapter to a DIN rail or top hat rail.

Since different kinds of operation characteristics can be stored in the memory 8C, the apparatus 1 according to the present invention is very flexible and adaptable for different kinds of use cases or scenarios, in particular different kinds of loads and facilities. For example, the characteristics memory 8C of the control unit 8 may provide an operation characteristic for an inductive load, an operation characteristic for a resistive load and/or an operation characteristic for a capacitive load. A user can select the type of the connected load via the input interface 12 of the user interface 15 and select what kind of load is connected to the output terminal 3 of the apparatus 1. If the user selects an inductive load, the operation characteristic stored for an inductive load is activated and made available to the processor 8A. In contrast, if the user selects a resistive load, a corresponding operation characteristic for a resistive load is activated and made available to the processor 8A. Further, if the user selects a capacitive load, a corresponding capacitive operation characteristic is loaded from the memory 8C and made available to the processor or FPGA 8A for operation of the apparatus 1. The output interface 13 can indicate what kind of operation characteristic is momentarily activated and may even display the operation characteristic on a display element of the output interface 13 to the user.

The control unit 8 can also determine whether the supply voltages received for different phases are symmetrical or not. If, for instance, one phase is missing a connected motor may not start. If the asymmetry becomes too high, the control unit 8 can trigger a warning and/or switch-off the power switch 5 and/or the relay circuit 14.

The apparatus 1 according to the present invention is not limited to the embodiments illustrated in FIGS. 1 to 8. As is evident from the above description, different features for the different embodiments can be combined with each other to provide different variants of the apparatus 1 according to the present invention. The apparatus 1 according to the present invention does not only provide a very efficient protection of the connected load, in particular overload protection and/or overcurrent protection but is also very flexible for different kinds of loads and/or use cases.

The features of the different embodiments shown in FIGS. 1 to 8 can be combined with each other.

The invention claimed is:

1. An apparatus for protection of a load connected to said apparatus, said apparatus comprising:
a power switch through which the connected load receives an electrical current;
a current rise speed sensor component connected in series with said power switch and configured to generate directly a first electrical voltage drop ($\Delta U_4$) corresponding to a current rise speed of the electrical current flowing via the current rise speed sensor component and via the power switch to the connected load; and
a driver circuit configured to detect an occurring overcurrent depending on the first voltage drop ($\Delta U_4$) generated by said current rise speed sensor component and a second voltage drop ($\Delta U_5$) along the power switch and to switch off the power switch upon detection of an overcurrent within a switch-off period of less than 1 millisecond to protect said power switch and the connected load,
wherein the first voltage drop ($\Delta U_4$) generated by the current rise speed sensor component plus the second voltage drop ($\Delta U_5$) along the power switch is applied as a sum voltage ($U_\Sigma$) to an input of the driver circuit,
wherein the driver circuit is configured to operate independently from a control unit of said apparatus to switch off the power switch within the switch-off period if the applied sum voltage ($U_\Sigma$) exceeds a threshold voltage ($U_{TH}$),
wherein the control unit is configured to control the driver circuit of the apparatus on reception of a control command from a user interface of the apparatus or from a remote device connected to the apparatus such that the power switch is switched either on or off in response to the received control command and
wherein the control unit is configured to control the driver circuit to switch off the power switch if a current profile of the electrical current, as measured by a load current measurement unit of said apparatus, indicates an overload of the load connected to said apparatus.

2. The apparatus according to claim 1 wherein the switch-off period is less than one (1) millisecond wherein the switch-off period is predefined by a connection circuitry connecting the current rise speed sensor component with the input of the driver circuit and by an internal circuitry of the driver circuit.

3. The apparatus according to claim 2, wherein the switch-off period is less than five (5) microseconds.

4. The apparatus according to claim 1 wherein the current rise speed sensor component comprises a coil, which is configured to generate an induction voltage, $U_L$, depending on the electrical current flowing through said current rise speed sensor component and through the power switch to the connected load.

5. The apparatus according to claim 1 wherein the driver circuit is configured to determine, based on the applied sum voltage ($U_\Sigma$), the occurring overcurrent and is configured to switch off the power switch upon detection of the overcurrent to protect the connected load and to protect the power switch within the switch-off period.

6. The apparatus according to claim 5, wherein the occurring overcurrent is a short circuit overcurrent.

7. The apparatus according to claim 1 comprising redundant protection mechanisms using different measurement techniques to protect the power switch against overload and against an overcurrent.

8. The apparatus according to claim 1 wherein the driver circuit is configured to switch off the power switch automatically, if the applied sum voltage ($U_\Sigma$) exceeds the threshold voltage ($U_{TH}$) within the switch-off period to protect the apparatus and the connected load against an overcurrent.

9. The apparatus according to claim 1 wherein the load current measurement unit is configured to continuously measure the electrical load current ($I_L$) flowing to the connected load and is configured to notify the control unit of the apparatus about the measured electrical load current.

10. The apparatus according to claim 1 wherein the control unit of said apparatus is configured to receive the control command from a computer connected to said apparatus or from a stored program control of an automation system.

11. The apparatus according to claim 1 wherein the power switch comprises an IGBT or a power MOSFET.

12. The apparatus according to claim 11, wherein the power MOSFET is selected from the group consisting of a SiC MOSFET, a GaN MOSFET and a ScAlN MOSFET.

13. The apparatus according to claim 1 wherein the power switch is configured to be switched on after a wait period or after-the overcurrent or overload conditions have cleared or if other predetermined switch-on conditions are fulfilled.

14. The apparatus according to claim 1 the load connected to the apparatus comprises an inductive load a capacitive load or a resistive load, which receives via the apparatus several electric AC current phases as operation currents from a power supply system connected to a corresponding input terminal of said apparatus.

15. The apparatus according to claim 14 wherein the apparatus comprises for each electrical current phase at least one current rise speed sensor component and an associated power switch being connected in series with said current rise speed sensor component and being controlled by an associated driver circuit of said apparatus.

16. The apparatus according to claim 14 wherein for each electrical current phase a first power switch is provided for a positive current half-wave of an AC current and wherein a second power switch is provided for a negative current half-wave of the AC current.

17. The apparatus according to claim 14 wherein the inductive load is multiphase motor.

18. The apparatus according to claim 1 wherein the user interface is configured to signal an operation state of said apparatus and of the load connected to said apparatus.

19. The apparatus according to claim 1 wherein the driver circuit comprises a low voltage side connected to the control unit and a high voltage side connected to the power switch, wherein the low voltage side and the high voltage side of the driver circuit are galvanically separated from each other.

20. The apparatus according to claim 1 further comprising an electromagnetic relay circuit connected in series to the power switch and controlled by the control unit of said apparatus.

21. The apparatus according to claim 1 wherein the control unit comprises:
a processor or FPGA circuit,
a data memory which stores current profile data and stores supply voltage profile data, and
a characteristics memory configured to store operation characteristics for different types of electrical loads.

22. The apparatus according to claim 1 further comprising at least one voltage divider circuit as a voltage sensor component at an input terminal or at an output terminal of the apparatus.

23. The apparatus according to claim 22 wherein the load current measurement unit and the voltage divider circuit are connected via analog-to-digital converters to the control unit of said apparatus.

24. A method for protection of a load connected to an apparatus, the method comprising the steps of:
generating a first voltage drop ($\Delta U_4$) directly at a current rise speed sensor component corresponding to a current rise speed of an electrical current flowing via the current rise speed sensor component and a power switch to the load,
detecting an occurring overcurrent depending on the first voltage drop ($\Delta U_4$) generated by said current rise speed sensor component and a second voltage drop ($\Delta U_5$) along the power switch,
wherein the power switch is automatically switched off by a driver circuit operating independently from a control unit within a switch-off period of less than 1 millisecond if the first voltage drop ($\Delta U_4$) plus the second voltage drop ($\Delta U_5$) along the power switch applied as a sum voltage ($U_\Sigma$) to an input of the driver circuit exceeds a threshold voltage ($U_{TH}$),
wherein the control unit controls the driver circuit on reception of a control command from a user interface or from a remote device such that the power switch is switched either on or off in response to the received control command and wherein the control unit controls the driver circuit to switch off the power switch if a current profile of the electrical current, as measured by a load current measurement unit, indicates an overload state of the load.

25. The method according to claim 24 wherein the switch-off period is less than one (1) millisecond, wherein the switch-off period is predefined by a connection circuitry connecting the current rise speed sensor component with the input of the driver circuit and by an internal circuitry of the driver circuit.

26. The method according to claim 25, wherein the switch-off period is less than five (5) microseconds.

* * * * *